United States Patent
Hintsala (10) Patent No.: US 12,414,187 B2
(45) Date of Patent: Sep. 9, 2025

(54) OUT OF BAND BLUETOOTH SYNCHRONIZATION TRANSFER

(71) Applicant: Silicon Laboratories Inc., Austin, TX (US)

(72) Inventor: Lauri Hintsala, Jokikunta (FI)

(73) Assignee: Silicon Laboratories Inc., Austin, TX (US)

( * ) Notice: Subject to any disclaimer, the term of this patent is extended or adjusted under 35 U.S.C. 154(b) by 429 days.

(21) Appl. No.: 18/070,624

(22) Filed: Nov. 29, 2022

(65) Prior Publication Data

US 2024/0179780 A1   May 30, 2024

(51) Int. Cl.
| | |
|---|---|
| *H04W 76/10* | (2018.01) |
| *H04J 3/06* | (2006.01) |
| *H04W 4/80* | (2018.01) |
| *H04W 12/04* | (2021.01) |
| *H04W 56/00* | (2009.01) |
| *H04W 76/20* | (2018.01) |

(52) U.S. Cl.
CPC .......... *H04W 76/20* (2018.02); *H04J 3/0667* (2013.01); *H04W 12/04* (2013.01); *H04W 56/001* (2013.01); *H04W 76/10* (2018.02)

(58) Field of Classification Search
CPC ... H04W 76/20; H04W 12/04; H04W 56/001; H04W 76/10; H04W 4/80; H04W 76/14; H04W 7/18558; H04B 3/544; H04J 3/0667
See application file for complete search history.

(56) References Cited

U.S. PATENT DOCUMENTS

| | | | |
|---|---|---|---|
| 9,002,750 B1 * | 4/2015 | Chu .................... | H04W 12/04 705/72 |
| 9,913,079 B2 * | 3/2018 | Srivatsa ................ | H04L 67/104 |
| 11,696,104 B1 * | 7/2023 | Alpert .................. | H04W 76/25 455/41.2 |
| 2002/0045424 A1 * | 4/2002 | Lee ....................... | H04W 52/40 455/41.2 |
| 2006/0199536 A1 * | 9/2006 | Eisenbach ......... | H04M 1/72412 455/41.2 |
| 2012/0173933 A1 * | 7/2012 | Greb .................... | G06F 11/076 714/47.1 |
| 2015/0133054 A1 * | 5/2015 | Chen .................... | H04W 4/80 455/41.2 |
| 2016/0227354 A1 * | 8/2016 | Zhao .................... | H04W 4/80 |
| 2017/0215054 A1 * | 7/2017 | Tsuchiya ........... | H04W 56/0025 |
| 2017/0289739 A1 * | 10/2017 | Trip ...................... | H04W 4/80 |
| 2018/0130011 A1 * | 5/2018 | Jacobsson ............ | H05K 13/021 |

(Continued)

*Primary Examiner* — Andrew Wendell
(74) *Attorney, Agent, or Firm* — Nields, Lemack & Frame, LLC (57) ABSTRACT

A system and method for transferring Bluetooth synchronization from a first Bluetooth device to a second Bluetooth device is disclosed. The first Bluetooth device may already be connected to a remote Bluetooth device. The method includes synchronizing time between the first Bluetooth device and a second Bluetooth device. After time has been synchronized, all relevant information concerning the connection is transmitted to the second Bluetooth. This may be done using an out of band network, such as UART, SPI, Ethernet, or a different wireless network. Once the first Bluetooth device has emptied its transmit queue, it may transfer communication responsibility to the second Bluetooth device.

16 Claims, 7 Drawing Sheets

(56) References Cited

U.S. PATENT DOCUMENTS

2018/0332563 A1* 11/2018 Sihlbom ............... H04W 48/10
2019/0273607 A1* 9/2019 Van Der Velden ..... H04L 9/088
2022/0191668 A1* 6/2022 Chen ................ H04M 1/72412
2022/0408382 A1* 12/2022 Mysore ................... H04W 4/80
2023/0007606 A1* 1/2023 Pu ..................... H04W 56/0015

* cited by examiner

OUT OF BAND BLUETOOTH SYNCHRONIZATION TRANSFER

FIELD

This disclosure describes a system and method for enabling a Bluetooth device to transfer a connection to another Bluetooth device.

BACKGROUND

As Bluetooth becomes more ubiquitous, new use cases are arising that were not originally envisioned or planned for. For example, roaming between different Bluetooth access points is currently handled by requiring a reconnection to the new access point. This may cause lost packets or a delay in communications.

Additionally, a concept known as electronic shelf labels (ESLs) is gaining popularity. An electronic shelf label is a device that has a display, which may be used to show the price of an item on the shelf. These labels may be connected to an access point, which is capable of changing the information on the display (such as price) remotely. As the number of electronic shelf labels increases, it may become difficult for one access point to maintain connection with all of the labels. Thus, additional access points may be used. However, load balancing between access points may be difficult. Additionally, it may be easier to initially configure the ESL in a certain location, prior to disposing it on the shelf. This movement of the ESL after initialization may require the ESL to associate with a different access point. There are other scenarios where the ease of moving between access points or devices is difficult.

Therefore, it would be beneficial if there was a system and method to transfer Bluetooth synchronization from one device to another. Further, it would be advantageous if the transfer of the requisite synchronization information occurred using a different network.

SUMMARY

A system and method for transferring Bluetooth synchronization from a first Bluetooth device to a second Bluetooth device is disclosed. The first Bluetooth device may already be connected to a remote Bluetooth device. The method includes synchronizing time between the first Bluetooth device and a second Bluetooth device. After time has been synchronized, all relevant information concerning the connection is transmitted to the second Bluetooth. This may be done using an out of band network, such as UART, SPI, Ethernet, or a different wireless network. Once the first Bluetooth device has emptied its transmit queue, it may transfer communication responsibility to the second Bluetooth device.

According to one embodiment, a method of transferring Bluetooth synchronization from a first Bluetooth device to a second Bluetooth device, wherein the first Bluetooth device has a connection to a remote Bluetooth device, is disclosed. The method comprises synchronizing clocks between the first Bluetooth device and the second Bluetooth device; transferring synchronization information from the first Bluetooth device to the second Bluetooth device; establishing a synchronization time and determining an event counter at the synchronization time; transmitting the synchronization time and event counter to the second Bluetooth device; and allowing the second Bluetooth device to take responsibility for the connection to the remote Bluetooth device at the synchronization time. In some embodiments, the synchronization information comprises at least one of a Bluetooth access address, a synchronization interval, latency and timeout parameters, a channel selection algorithm and current channel map PHY configuration. In some embodiments, the and an active information comprises security keys and NONCE synchronization values. In some embodiments, clock synchronization is performed using NTP or PTP. In some embodiments, the synchronization information is transferred from the first Bluetooth device to the second Bluetooth device using an out of band connection. In certain embodiments, the out of band connection comprises UART, SPI, Ethernet, WiFi, Thread, or Zigbee. In some embodiments, the second Bluetooth device monitors communication between the first Bluetooth device and the remote Bluetooth device after the synchronization information is transferred to improve clock synchronization n with the first Bluetooth device prior to the synchronization time According to another embodiment, a system is disclosed. The system comprises a first Bluetooth device; and a helper device; wherein the helper device scans for a new device, establishes a connection with the new device, and after establishing the connection, transfers the connection to the first Bluetooth device. In some embodiments, the first Bluetooth device is an AoA locator device. In some embodiments, the first Bluetooth device is an ESL access point. In some embodiments, the helper device transfers the connection by: synchronizing a clock of the helper device to a clock of the first Bluetooth device; transferring synchronization information to the first Bluetooth device; determining a synchronization time and event counter at the synchronization time; and transmitting the synchronization time and event counter to the first Bluetooth device.

According to another embodiment, a Bluetooth device is disclosed. The Bluetooth device comprises a Bluetooth network interface; a processing unit; and a memory device, comprising instructions, which, when executed by the processing unit, enable the Bluetooth device to: establish a connection with a remote Bluetooth device; synchronize clocks between the Bluetooth device and a second Bluetooth device; transfer synchronization information from the Bluetooth device to the second Bluetooth device; establish a synchronization time and determine an event counter at the synchronization time; transmit the synchronization time and event counter to the second Bluetooth device; and relinquish responsibility for the connection to the remote Bluetooth device at the synchronization time. In some embodiments, the synchronization information comprises at least one of a Bluetooth access address, a synchronization interval, latency and timeout parameters, a channel selection algorithm and current channel map and an active PHY configuration. In some embodiments, the synchronization information comprises security keys and NONCE values. In some embodiments, clock synchronization is performed using NTP or PTP. In some embodiments, synchronization information is transferred from the Bluetooth device to the second Bluetooth device using an out of band connection. In certain embodiments, the out of band connection comprises UART, SPI, Ethernet, WiFi, Thread, or Zigbee.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
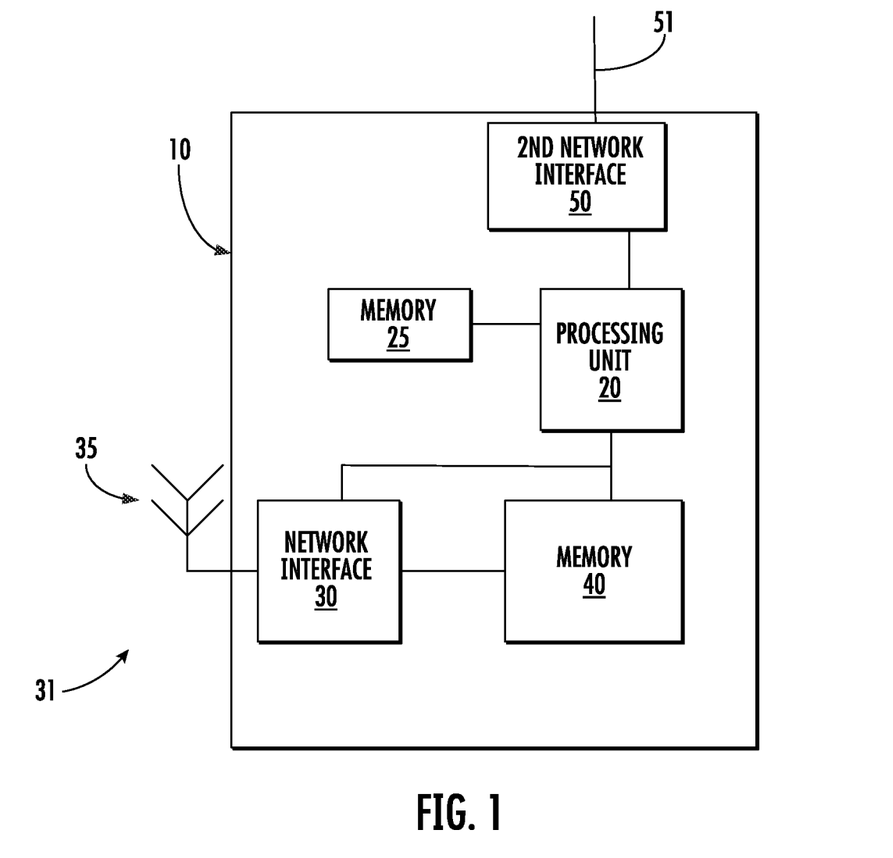
FIG. 1 shows a block diagram of a Bluetooth device according to one embodiment.

FIG. 1 shows a block diagram of a representative Bluetooth device 10 that may transfer a connection to another Bluetooth device.

The Bluetooth device 10 has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions, which, when executed by the processing unit 20, enable the Bluetooth device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 1. The second computer readable non-transitory media may be a CDROM, or a different memory device, which is located remote from the Bluetooth device 10. The instructions contained on this second computer readable non-transitory media may be downloaded onto the memory device 25 to allow execution of the instructions by the Bluetooth device 10.

The Bluetooth device 10 also includes a Bluetooth network interface 30 that connects with a Bluetooth network 31 using an antenna 35.

The Bluetooth device 10 may include a second memory device 40 in which data that is received and transmitted by the Bluetooth network interface 30 is stored. This second memory device 40 is traditionally a volatile memory. The processing unit 20 has the ability to read and write the second memory device 40 so as to communicate with the other devices in the Bluetooth network 31.

The Bluetooth device 10 also includes a second network interface 50 in communication with an external connection 51. This second network interface may be a wired connection, such as SPI, UART, Ethernet and others. In these embodiments, the external connection 51 may be a connector. Alternatively, the second network interface 50 may be a different wireless connection, such as Zigbee Thread, Z-Wave, WiFi and others.

Although not shown, the Bluetooth device 10 also has a power supply, which may be a battery or a connection to a permanent power source, such as a wall outlet.

While the processing unit 20, the memory device 25, the Bluetooth network interface 30, the second network interface 50 and the second memory device 40 are shown in FIG. 1 as separate components, it is understood that some or all of these components may be integrated into a single electronic component. Rather, FIG. 1 is used to illustrate the functionality of the Bluetooth device 10, not its physical configuration.

Figure 2:
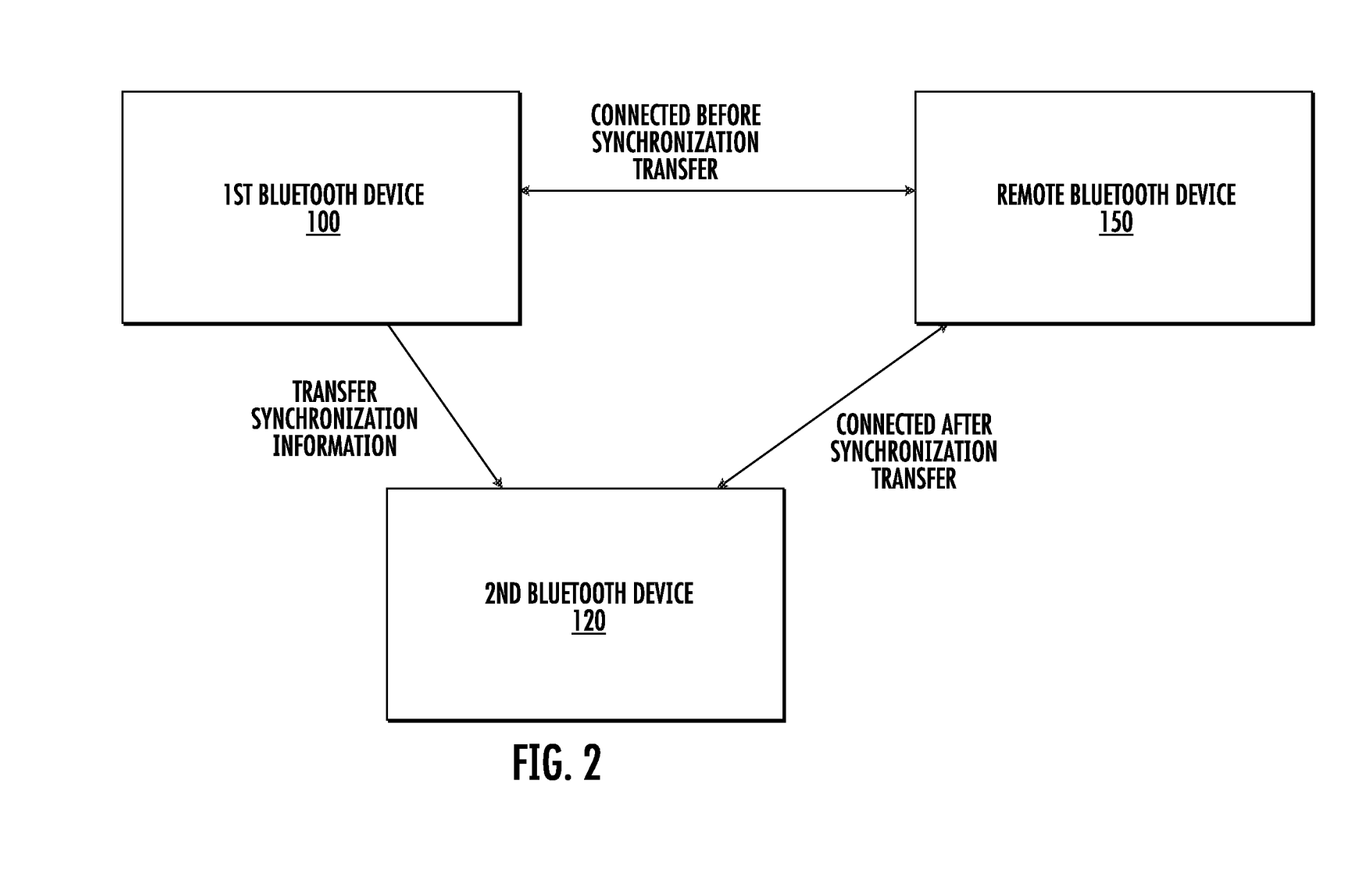
FIG. 2 shows a network with multiple Bluetooth devices, where synchronization is being transferred.

FIG. 2 shows a configuration of three Bluetooth devices. The first Bluetooth device 100 may have previously established a connection to the remote Bluetooth device 150. The second Bluetooth device 120 is currently not connected to either device. It may be desirable to transfer synchronization data so that the connection becomes between the second Bluetooth device 120 and the remote Bluetooth device 150. The first Bluetooth device 100 and the second Bluetooth device 120 may have architectures similar to that shown in FIG. 1.

The first Bluetooth device 100 may then establish a connection with the second Bluetooth device 120. Next, the first Bluetooth device 100 and the second Bluetooth device 120 synchronize their internal clocks. Bluetooth connection and periodic advertising is based on time synchronized communications. Thus, when the first Bluetooth device 100 relinquishes control to the second Bluetooth device 120, the second Bluetooth device 120 must start communications at exactly the same time that the first Bluetooth device 100 would have started, if the synchronized transfer had not happened. The required clock accuracy may depend on the Bluetooth role. Central devices must achieve microsecond level accuracy. Peripheral devices have more flexibility and may be less accurate, especially if they employ a wider Rx (receive) window. Thus, peripheral devices may be accurate to within a few hundred microseconds.

This clock synchronization may be done in a number of ways.

For example, in one embodiment, network time protocol (NTP), precision time protocol (PTP) or a similar algorithm is used. The time stamp may be transmitted from the first Bluetooth device 100 to the second Bluetooth device 120 using the second network interface 50.

In another embodiment, the first Bluetooth device 100 and the second Bluetooth device 120 may share a wired signal. The first Bluetooth device may toggle this signal and then provide the second Bluetooth device a timestamp that corresponds to the time of the toggle.

In another embodiment, a packet may be received by both the first Bluetooth device 100 and the second Bluetooth device 120. The first Bluetooth device 100 may then provide a timestamp to the second Bluetooth device informing it of the time that the packet was received.

Of course, other method of clock synchronization may be utilized as well.

Note that the time synchronization may be performed at other points in this sequence. For example, the time synchronization may be performed before the first Bluetooth device 100 establishes a connection to the remote Bluetooth device 150. Alternatively, the time synchronization may be performed after the synchronization information is transmitted, as explained below.

The first Bluetooth device 100 then collects all of the information related to the connection to the remote Bluetooth device 150. This information may be referred to as synchronization information. This synchronization information may include, but is not limited to:

the Bluetooth access address;
the synchronization interval, latency and timeout parameters;
the channel selection algorithm and current channel map;
active PHY configuration;
security keys and NONCE if data is encrypted; and
link parameters, such as supported featured, maximum packet length and others.

The first Bluetooth device 100 then determines an exact time for the synchronization transfer procedure. The first Bluetooth device 100 also determines the event counter, referred to #c at the time of the synchronization transfer. The value of the event counter at the time of synchronization transfer is important for several reasons. In Bluetooth communications, the event counter is used by the channel selection algorithm to determine which channel to transmit and receive on. In addition, the event counter is also used in some link layer control procedures (LLCP). Thus, it is mandatory to maintain the same event counter at both the central and peripheral devices.

The synchronization information and the time for the synchronization transfer procedure are then transmitted to the second Bluetooth device 120. This may be performed using the second network interface 50.

Once the second Bluetooth device 120 receives the synchronization information and the synchronization time, it may begin listening to the communications between the first Bluetooth device 100 and the remote Bluetooth device 150. The second Bluetooth device 120 may tune its clock based on these monitored communications. In other words, the clock synchronization procedure described above may bring the clock of the second Bluetooth device 120 to a value close to that of the first Bluetooth device 100. However, the second Bluetooth device 120 may further refine this clock synchronization by monitoring transmissions and comparing the timestamp of a received packet from first Bluetooth device 100 and adjust its clock based on that information.

By the time that the synchronization time arrives, the first Bluetooth device 100 has emptied its data transmission queue so that it has no packets left to transmit to the remote Bluetooth device 150.

When the synchronization time arrives, the first Bluetooth device 100 stops transmitting to the remote Bluetooth device 150. Additionally, the second Bluetooth device 120 takes responsibility of this connection and being transmitting to the remote Bluetooth device 150. Note that remote Bluetooth device 150 is unaware of this change. From the perspective of the remote Bluetooth device 150, the second Bluetooth device 120 appears to be the first Bluetooth device 100.

Figure 3A:
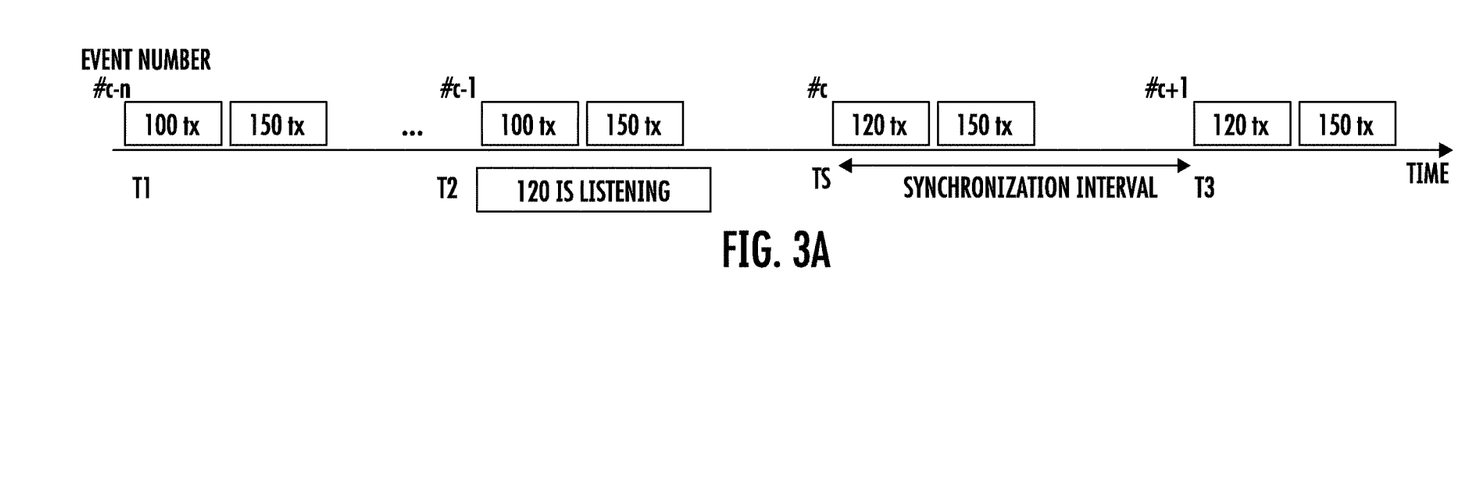
FIGS. 3A-3B shows two timelines showing synchronization transfer.
Figure 3B:
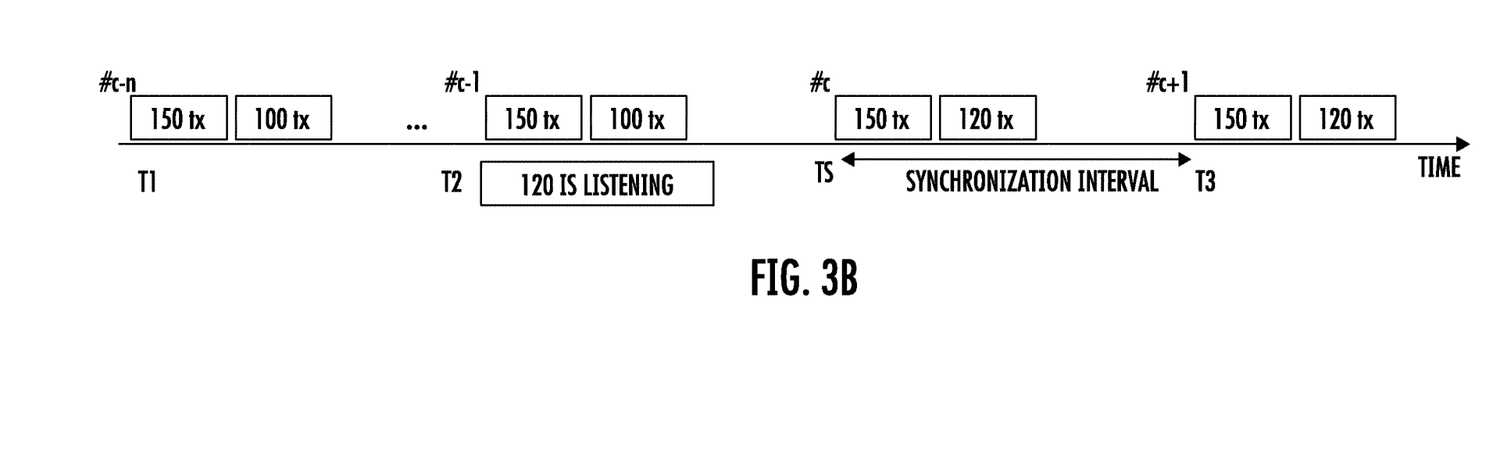

FIGS. 3A-3B show two timelines showing the synchronization transfer described above. In each of these figures, the boxes represent communications that are performed by the indicated device. Note that in these figures, all packets are transmitted packets.

In FIG. 3A, the first Bluetooth device 100 is a central device, while the remote Bluetooth device 150 is a peripheral device. It is assumed that previously, the peripheral device had transmitted advertising packets and the first Bluetooth device 100 had initiated a connection to the remote Bluetooth device 150. In this figure, #c represents the event counter at the synchronization transfer. The event before that transfer is #c-1, while #c-n represents some event earlier than that.

At some time, shown as T1 on the figure, preparations begin for the synchronization transfer. The first Bluetooth device 100 may collect synchronization information, as described above. Additionally, the clocks of the first Bluetooth device 100 and the second Bluetooth device 120 are synchronized. Additionally, the exact time of the synchronization transfer (Ts) and the event counter, #c, at the time of transfer, are communicated to the second Bluetooth device 120. Event #c-1 represents the last connection event that is performed by the first Bluetooth device 100. Note that at some time prior to the transfer, denoted as T2, the remote Bluetooth device 150 is synchronized to the first Bluetooth device 100. After the synchronization information has been transmitted, the second Bluetooth device 120 may begin monitoring packets between the first Bluetooth device 100 and the remote Bluetooth device 150. As explained above, this may allow the second Bluetooth device 120 to more accurately synchronize its clock to that of the first Bluetooth device 100. At the time of synchronization transfer, Ts, second Bluetooth device 120 assumes responsibility for the connection with remote Bluetooth device 150, beginning at event counter #c. Thus, the remote Bluetooth device 150 is now synchronized to the second Bluetooth device 120. After this time Ts, as shown in the figure, the connection is now between the second Bluetooth device 120 and the remote Bluetooth device 150. For example, after a predetermined period of time, referred to as the synchronization interval, another packet will be transmitted by the second Bluetooth device 120.

In FIG. 3B, the first Bluetooth device 100 is a peripheral device, while the remote Bluetooth device 150 is a central device. It is assumed that previously, the peripheral device had transmitted advertising packets and the remote Bluetooth device 150 had initiated a connection to the first Bluetooth device 100.

As described above, at some time, shown as T1 on the figure, preparations begin for the synchronization transfer. The first Bluetooth device 100 may collect synchronization information, as described above. Additionally, the clocks of the first Bluetooth device 100 and the second Bluetooth device 120 are synchronized. Additionally, the exact time of the synchronization transfer, Ts, and the event counter, #c, at the time of transfer, are communicated to the second Bluetooth device 120. Event #c-1 represents the last connection event that is performed by the first Bluetooth device 100. Note that at some time prior to the transfer, denoted as T2, the first Bluetooth device 100 is synchronized to the remote Bluetooth device 150. After the synchronization information has been transmitted, the second Bluetooth device 120 may begin monitoring packets between the first Bluetooth device 100 and the remote Bluetooth device 150. At the time of synchronization transfer, Ts, second Bluetooth device 120 assumes responsibility for the connection with remote Bluetooth device 150, beginning at event counter #c. Thus, the second Bluetooth device 120 is now synchronized to the remote Bluetooth device 150. After this time, as shown in the figure, the connection is now between the second Bluetooth device 120 and the remote Bluetooth device 150.

Figure 4A:
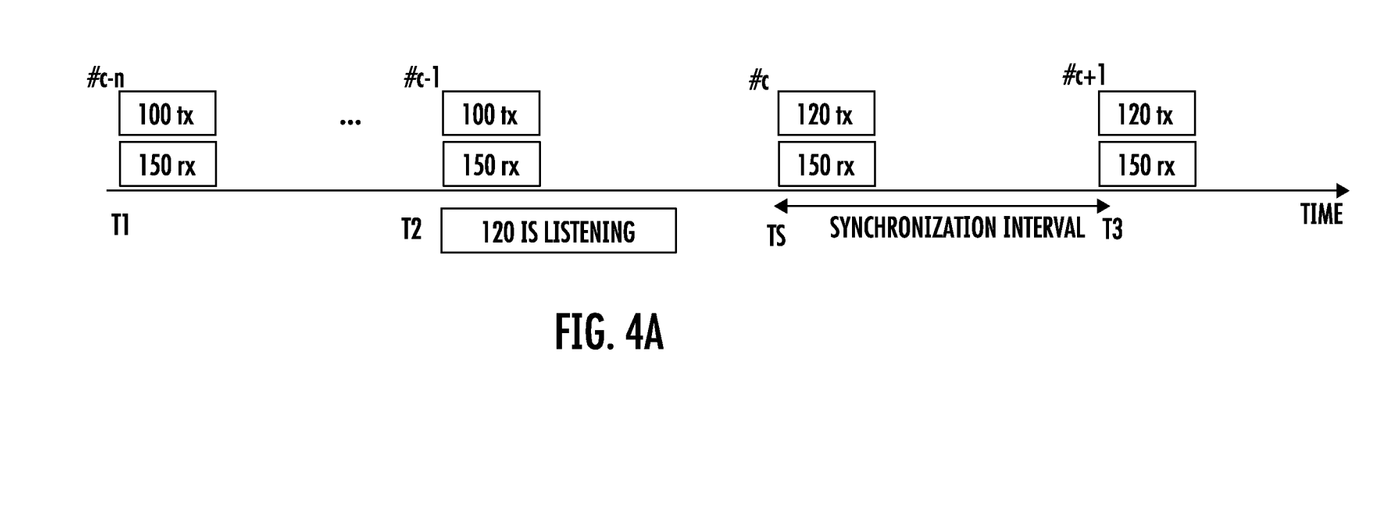
FIGS. 4A-4B shows two additional timelines showing synchronization transfer.
Figure 4B:
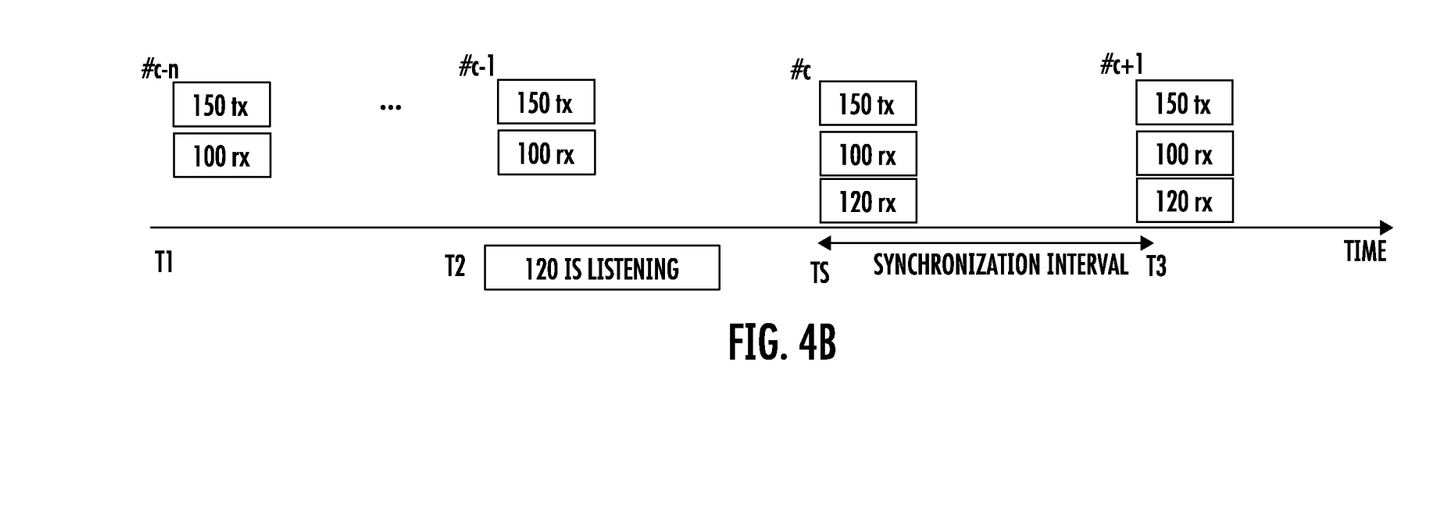

FIGS. 4A-4B show two timelines showing the synchronization transfer described above in a different scenario. In each of these figures, the boxes represent communications that are performed by the indicated device. In FIG. 4A, the first Bluetooth device 100 is performing periodic advertising and is transmitting packets. In FIG. 4B, the first Bluetooth device 100 is receiving periodic advertising and the remote Bluetooth device 150 is transmitting packets.

These timelines are very similar to those shown in FIGS. 3A-3B. Notably, in FIG. 4A, the operations performed at times T1 and T2 are the same as those described with respect to FIG. 3A. However, in this scenario, starting at event #c, the second Bluetooth device 120 takes over responsibility for the periodic advertising.

The sequence shown in FIG. 4B is similar to that shown in FIG. 3B. In this scenario, the remote Bluetooth device 150 is performing periodic advertising and the first Bluetooth device 100 receives that advertising. Here, as in FIG. 3B, the first Bluetooth device 100 transfers the synchronization information to the second Bluetooth device. At event #c, the second Bluetooth device 120 is now synchronized to the remote Bluetooth device 150 and receives the subsequent advertising. Note that in this scenario, the first Bluetooth device 100 may continue receiving the periodic advertising if desired.

The present system and method has many advantages. The synchronization transfer described herein may be utilized to address many current use cases. For example, the synchronization transfer may be used to support roaming Bluetooth connections, where the connection needs to be transferred to a different access point. In Bluetooth roaming, the Bluetooth access points are typically connected using Ethernet or WiFi. Thus, the synchronization information may be transmitted between Bluetooth access points over this connection.

In another embodiment, synchronization transfers may be used to support load balancing between access points in a location where many electronic shelf labels are deployed. This may also allow the ESL to be configured at a first location, using one access point and then moved to its permanent location, which is serviced by a different access point. As described above, in this embodiment, access points are typically connected using Ethernet or WiFi, which provides the mechanism to transfer the synchronization information.

Figure 5:
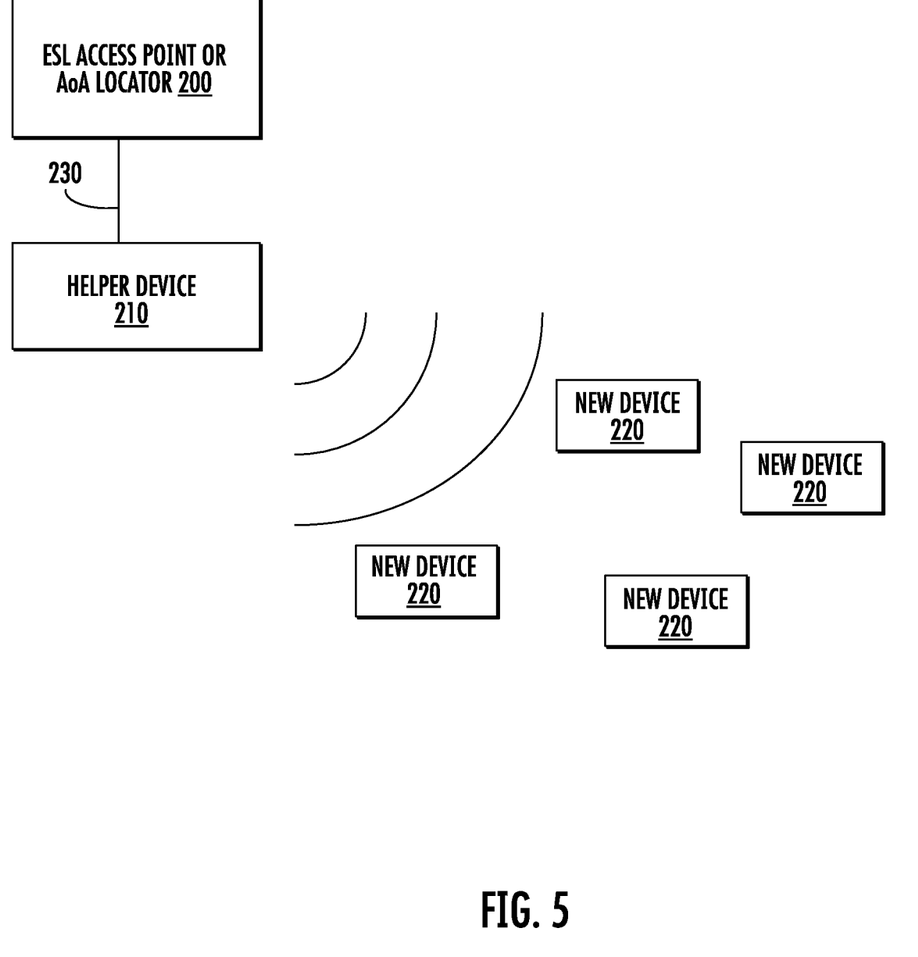
FIG. 5 shows a specific embodiment using synchronization transfers.

In another embodiment, shown in FIG. 5, synchronization transfers may be used to support ESL (Electronic Shelf Label) access points or AoA (Angle of Arrival) locators. ESL access points and AoA locators 200 may be responsible for connections with many devices. The time required to maintain these connections may not afford sufficient time to scan for new devices. In this embodiment, a helper device 210 may be used. The helper device 210 is a Bluetooth device that is responsible for identifying new devices 220 in the range of the ESL access point or AoA locator 200 and establishing a connection with those new devices 220. Once these connections are made, the helper device 210 transfers these new connections to the ESL access point or AoA locator 200. In certain embodiments, the helper device 210 is sufficiently close to the ESL access point or AoA locator 200, such that a dedicated connection 230, such as UART or SPI, may be used to transfer the synchronization information.

In another embodiment, one Bluetooth device may be used to scan for new devices, configure them, and then transfer synchronization to another Bluetooth device that does the actual synchronized communication. In case of AoA, one Bluetooth device could search for new devices, create periodic advertising synchronization and then transfer periodic advertising synchronization to that actual AoA locator, which then performs actual AoA measurements.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of transferring Bluetooth synchronization from a first Bluetooth device to a second Bluetooth device, wherein the first Bluetooth device has a connection to a remote Bluetooth device, the method comprising:
    synchronizing clocks between the first Bluetooth device and the second Bluetooth device;
    transferring synchronization information from the first Bluetooth device to the second Bluetooth device;
    establishing a synchronization time and determining an event counter at the synchronization time;
    transmitting the synchronization time and event counter to the second Bluetooth device; and
    allowing the second Bluetooth device to take responsibility for the connection to the remote Bluetooth device at the synchronization time.

2. The method of claim 1, wherein the synchronization information comprises at least one of a Bluetooth access address, a synchronization interval, latency and timeout parameters, a channel selection algorithm and current channel map and an active physical layer (PHY) configuration.

3. The method of claim 1, wherein the synchronization information comprises security keys and Number Once (NONCE) values.

4. The method of claim 1, wherein clock synchronization is performed using network time protocol (NTP) or precision time protocol (PTP).

5. The method of claim 1, wherein the synchronization information is transferred from the first Bluetooth device to the second Bluetooth device using an out of band connection.

6. The method of claim 5, wherein the out of band connection comprises Universal Asynchronous Receiver/Transmitter (UART), Serial Peripheral Interface (SPI), Ethernet, WiFi, Thread, or Zigbee.

7. The method of claim 1, wherein the second Bluetooth device monitors communication between the first Bluetooth device and the remote Bluetooth device after the synchronization information is transferred to improve clock synchronization with the first Bluetooth device prior to the synchronization time.

8. A system, comprising:
    a first Bluetooth device; and
    a helper device; wherein the helper device scans for a new device, establishes a connection with the new device, and after establishing the connection, transfers the connection to the first Bluetooth device by:
    synchronizing a clock of the helper device to a clock of the first Bluetooth device;
    transferring synchronization information to the first Bluetooth device;

determining a synchronization time and event counter at the synchronization time; and transmitting the synchronization time and event counter to the first Bluetooth device.

9. The system of claim 8, wherein the first Bluetooth device is an Angle of Arrival (AoA) locator device.

10. The system of claim 8, wherein the first Bluetooth device is an Electronic Shelf Label (ESL) access point.

11. A Bluetooth device, comprising:
a Bluetooth network interface;
a processing unit; and
a memory device, comprising instructions, which, when executed by the processing unit, enable the Bluetooth device to:
establish a connection with a remote Bluetooth device;
synchronize clocks between the Bluetooth device and a second Bluetooth device;
transfer synchronization information from the Bluetooth device to the second Bluetooth device;
establish a synchronization time and determine an event counter at the synchronization time;
transmit the synchronization time and event counter to the second Bluetooth device; and
relinquish responsibility for the connection to the remote Bluetooth device at the synchronization time.

12. The Bluetooth device of claim 11, wherein the synchronization information comprises at least one of a Bluetooth access address, a synchronization interval, latency and timeout parameters, a channel selection algorithm and current channel map and an active physical layer (PHY) configuration.

13. The Bluetooth device of claim 11, wherein the synchronization information comprises security keys and Number Once (NONCE) values.

14. The Bluetooth device of claim 11, wherein clock synchronization is performed using network time protocol (NTP) or precision time protocol (PTP).

15. The Bluetooth device of claim 11, wherein synchronization information is transferred from the Bluetooth device to the second Bluetooth device using an out of band connection.

16. The Bluetooth device of claim 15, wherein the out of band connection comprises Universal Asynchronous Receiver/Transmitter (UART), Serial Peripheral Interface (SPI), Ethernet, WiFi, Thread, or Zigbee.

* * * * *